H. J. HOYT.
ADJUSTABLE CHUCK OR SPIDER.
APPLICATION FILED MAR. 16, 1911.
1,008,544.
Patented Nov. 14, 1911.
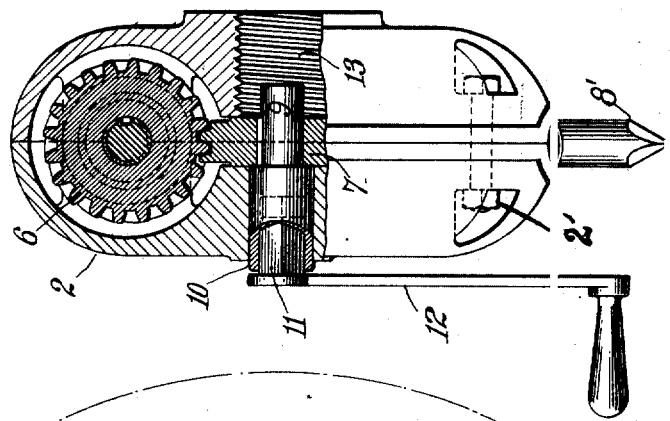
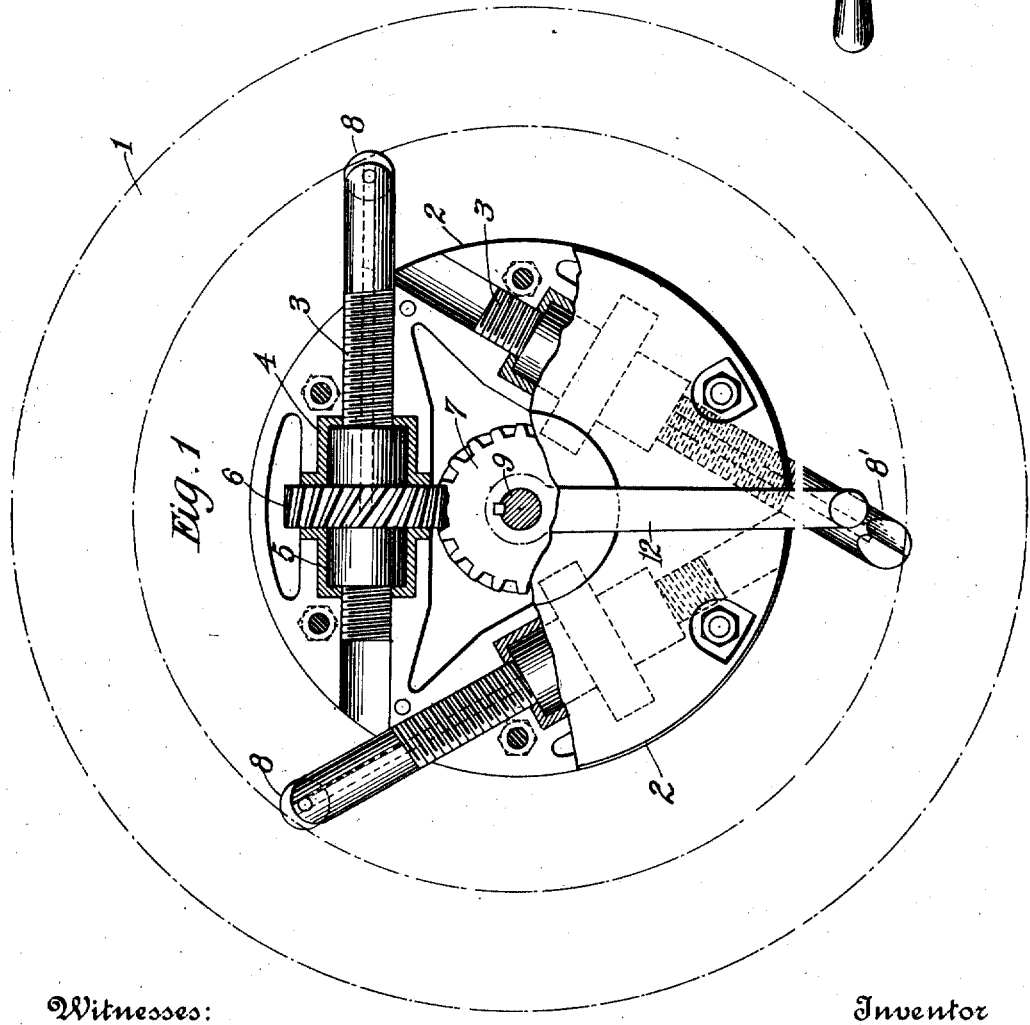
Witnesses:
B. V. Mohan
R. Eckhardt
Inventor
Home. J. Hoyt
By his Attorney
Ernest Hopkinson

UNITED STATES PATENT OFFICE.

HOMER J. HOYT, OF DETROIT, MICHIGAN.

ADJUSTABLE CHUCK OR SPIDER.

1,008,544.     Specification of Letters Patent.     Patented Nov. 14, 1911.

Application filed March 16, 1911. Serial No. 614,828.

*To all whom it may concern:*

Be it known that I, HOMER J. HOYT, a citizen of the United States, residing in the city of Detroit, State of Michigan, have invented certain new and useful Improvements in Adjustable Chucks or Spiders, of which the following is a full, clear, and complete disclosure.

My invention relates to universal or adjustable chucks or spiders for holding and driving rings or other similar objects whose inner surfaces are circular or cylindrical.

My improved chuck is particularly adapted for use in connection with tire-building machines in which the ring or mold, upon which the tire is formed and built up during the application of the rubber fabric, is rotatably supported while such fabric is being applied thereto and forced into the requisite shape of a tire under tension. In this type of machine the chuck is usually mounted at the end of a spindle or shaft which is uniformly rotated by power-driven means.

The object of my invention is to produce a chuck or spider in which the arms or projecting supports are made adjustable, and an adjustment permitted between greater limits in a radial direction than has heretofore been possible.

Briefly described, my invention comprises providing a suitable hub or casing through which the supporting arms pass, substantially on the chords of the circle forming the outer circumference of the casing. These arms are made adjustable by means hereafter to be described more in detail.

For a detailed description of one form of my invention which I at present deem preferable, reference may be had to the following specification, and to the accompanying drawing forming a part thereof, in which:

Figure 1 is a vertical elevation of my improved chuck, part of the same being shown in section to disclose the arrangement of the supporting arms and the operating mechanism. Fig. 2 is a side elevation thereof, the upper half of the device being shown in vertical section on a diametrical line.

Referring to the drawing, the numeral 1 indicates a ring (shown in dotted and dash lines) which may be used as a support for a tire when the same is being built up, or may be any other similar device, and 2 indicates the casing or hub of the chuck which is preferably formed in two circular sections secured together by any suitable bolts, as indicated at 2'.

The numeral 3 indicates the supporting arms for the chuck which pass through holes formed in the two halves of the casing, which holes are enlarged at their central portions, as indicated as 4, to receive the hubs 5 of spiral gears 6. The arms 3 are screw-threaded for a considerable portion of their lengths within the casing 2, the inner surface of the hubs 5 also being screw-threaded to correspond therewith. The spiral gears 6 being mounted transversely of the plane of the chuck, are arranged so that their pitch lines cross the same circle in the plane of the chuck, and a spiral gear 7 is located in a recess in the central portion of the chuck and meshes with each of the spiral gears 6. The gear 7 is provided with a central opening within which is keyed a shaft or stud 9 which is enlarged at its outer edge, as indicated at 10, and provided with an angular recess adapted to receive an angular hub 11 of a crank 12. The outer ends of the supporting arms 3 are provided with any suitable means for giving a firm hold upon the ring being supported, and in this instance I have shown two of the arms provided with sharp-edged rollers 8 and a tapering end 8', all of which are adapted to fit within a groove or small recess or recesses in the ring 1. The central portion of the chuck on that side opposite to the socket 10 contains an opening which is interiorly screw-threaded, as indicated at 13. This opening is adapted to pass over the end of a suitable supporting and driving shaft which is also screw-threaded to correspond thereto.

The operation of the device will be obvious from the above description. When the chuck is in position on the end of the driving shaft and it is desired to remove or place a ring in position, it is only necessary to insert the hub 11 of the crank 12 in the socket 10 and turn the same in such a direction as will withdraw or extend the arms 3. After this the ring may be removed and the tire building or other operation proceeded with.

What I claim and desire to protect by Letters Patent is:

1. A chuck or spider, comprising extensible screw-threaded arms having their axes tangent to a common circle about the axis of said chuck, rotatable screw-threaded members carried on said arms, and means for rotating said members about said arms for simultaneously extending or withdrawing the latter.

2. A chuck or spider comprising, a suitable casing having holes extending therethrough substantially on chords of the circle of the outer circumference of the chuck, screw threaded arms located in said holes, interiorly screw threaded stops on said arms and means located centrally of said chuck and adapted to simultaneously rotate said stops to withdraw or extend said arms.

3. A chuck or spider comprising, a suitable casing having holes passing therethrough on chords of the circle forming the outer circumference of said chuck, extensible arms located in said holes and having their inner portions screw-threaded, screw-gears mounted on said arms within said casing, and a central screw-gear meshing with said first named screw-gears and adapted to simultaneously rotate the latter.

4. A chuck or spider comprising, a suitable casing having holes passing therethrough on chords of the circle forming the outer circumference of said chuck, screw-threaded arms located in said holes, internally threaded screw-gears mounted on said arms within said casing, a central screw-gear meshing with the first named screw gears and located in the central plane of said chuck, a central shaft on which said central gear is fixed, and means for rotating said central gear within said casing.

Signed at the city of Detroit, State of Michigan, this 13 day of March, 1911.

HOMER J. HOYT.

Witnesses:
VIVIAN L. STONE,
F. E. SCHULTZ.

Copies of this patent may be obtained for five cents each, by addressing the "Commissioner of Patents, Washington, D. C."